Sept. 10, 1963     D. M. GORDON     3,103,128
ENGINE IDLE SPEED CONTROL

Filed Feb. 24, 1959                                                   7 Sheets-Sheet 1

INVENTOR.
DWIGHT M. GORDON
BY
*Laurence M. Goodridge*
ATTORNEY

INVENTOR.
DWIGHT M. GORDON
BY
Laurence M. Goodridge
ATTORNEY

Sept. 10, 1963 D. M. GORDON 3,103,128
ENGINE IDLE SPEED CONTROL
Filed Feb. 24, 1959 7 Sheets-Sheet 5

INVENTOR.
DWIGHT M. GORDON
BY
Laurence M. Goodridge
ATTORNEY

INVENTOR.
DWIGHT M. GORDON
BY
ATTORNEY

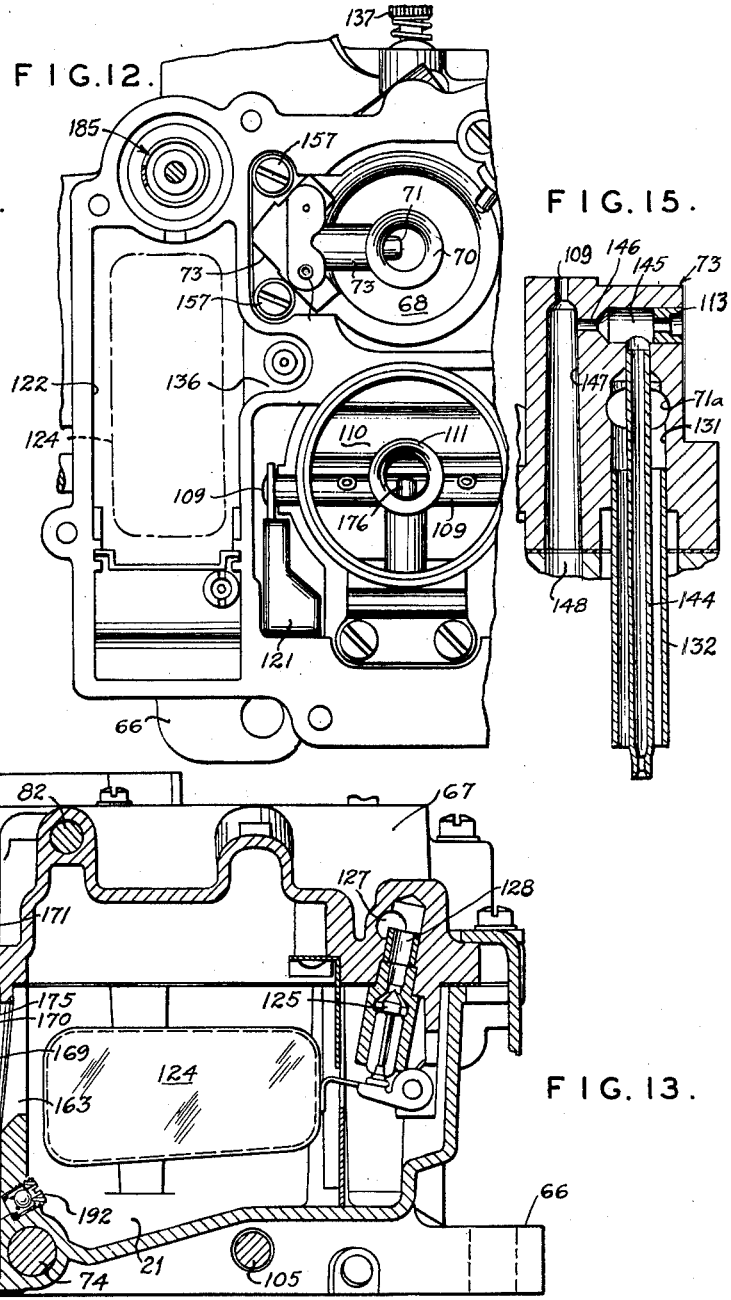

United States Patent Office 3,103,128
Patented Sept. 10, 1963

3,103,128
ENGINE IDLE SPEED CONTROL
Dwight M. Gordon, Farmington, Mich., assignor to ACF Industries, Incorporated, New York, N.Y., a corporation of New Jersey
Filed Feb. 24, 1959, Ser. No. 794,949
21 Claims. (Cl. 74—472)

This invention relates to automotive vehicles having internal combustion engines and engine powered accessories and consists particularly in novel means for increasing the idling speed of the engine under certain conditions, for instance, when the transmission is in neutral and such accessory is in "on" condition.

While it is customary to set the idling speed of the engine at a relatively low rate under normal temperature conditions, it has been found that such normal idling speed may not be sufficient to operate certain engine-powered accessories, such as an air conditioning compressor and blower, or power steering mechanism, or the like. Where the engine is equipped with an automatic transmission or fluid coupling, it is not feasible to set the normal idling speed, by means of the usual manual adjustment, high enough to properly carry such load applying accessories since, when the transmission is shifted to a drive position the vehicles may creep excessively.

Consequently, it is the main object of the present invention to provide novel means for increasing the idling speed of the engine only when the transmission is in neutral and/or the engine-powered accessory is in load applying condition.

More specifically, it is an object of the present invention to provide means for variably restricting the idling air by-pass, in a carburetor equipped with such by-pass, coincidentally with conditioning of such an accessory to apply a load to the engine.

Still another object is to provide a novel manually and automatically adjustable restricting means for the idling air by-pass.

These objects are accomplished substantially by solenoid and manually adjustable control valve means for the idling air by-pass, the core of the solenoid being positioned to variably penetrate and obturate the by-pass and, thereby, automatically control the idling speed. Surrounding the solenoid core and extending to an accessible position outside the carburetor is a threaded sleeve provided with a screw driver kerf at the outer end and a stop at its inner portion for manually adjusting the normal expanded position of the solenoid valve and, accordingly, the normal idling speed of the engine.

In the accompanying drawings, FIG. 1 is a schematic representation of an automotive vehicle chassis;

FIG. 12 is a representation of the top of a portion of the body of the carburetor and is taken substantially on line 12—12 of FIG. 9;

FIG. 13 is a vertical transverse section taken on line 13—13 of FIG. 7;

FIGS. 14 and 15 are detail sections taken on the corresponding section lines of FIG. 7;

Figure 1:
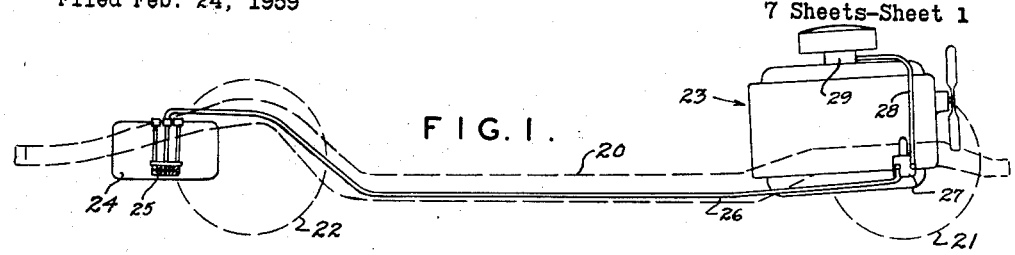
Figure 2:
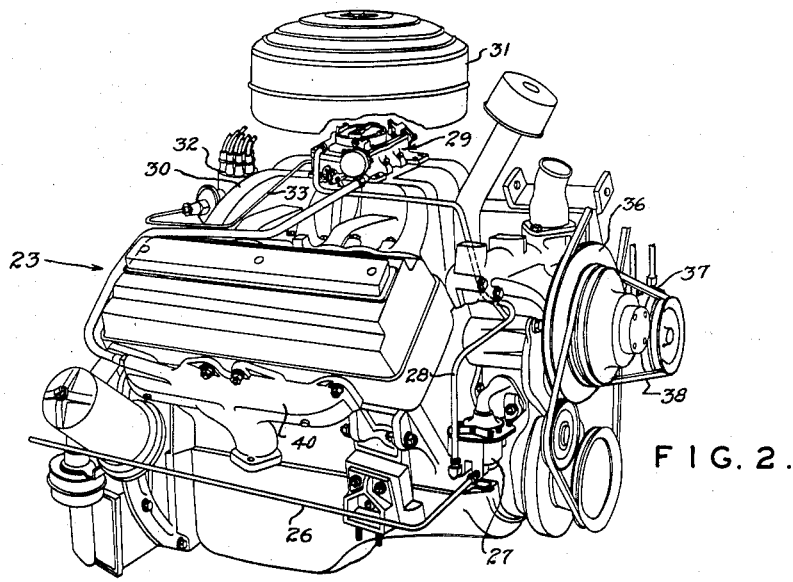
FIGS. 2 and 3 are perspective views of the V-type engine mounted on the front of the chassis.

FIG. 1 shows the chassis 20 of an automotive vehicle mounted on front and rear wheels 21 and 22 and mounting an engine 23 at the front and a fuel tank 24 at the rear. An electric fuel pump 25 mounted in the tank supplies fuel through a line 26 to a mechanical fuel pump 27 mounted on the side of the engine and a second fuel line 28 connects pump 27 to the carburetor 29 centrally mounted on intake manifold 30 between the cylinder banks of the engine. The use of one or both pumps is optional. A conventional air cleaner 31 is mounted on top of the carburetor.

The engine distributor is shown at 32 and is connected by a suction line 33 to the spark-advance port fitting of the carburetor. A generator is shown at 34 and is connected by a belt 35 to sheave 36 on the front end of the crankshaft. An air conditioner compressor 37 is also mounted on the engine and connected by a belt 38 to sheave 36 on the crankshaft. Exhaust manifolding is shown at 40.

Figure 4:
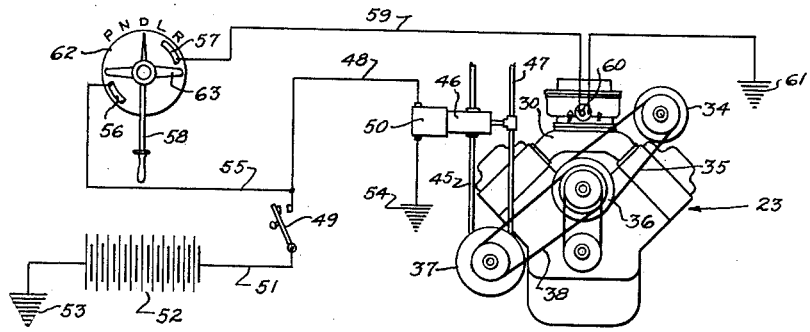
FIG. 4 is a schematic representation of the engine and associated air conditioning elements and transmission control.

In FIG. 4 there is represented the compressor portion of an air conditioning system including condensate return line 45 having solenoid actuated control valve 46, and a line 47 for supplying condensed refrigerant to the evaporator. The air conditioner control circuit includes a wire 48, connecting control switch 49 to control valve actuating solenoid 50, and wire 51 leading from the switch to battery 52 which is grounded at 53. Solenoid 50 is grounded at 54. A second circuit includes a wire 55 which breaks through switch terminals 56 and 57 adjacent transmission control lever 58 and thence through wire 59 and idle speed adjusting mechanism 60 on the carburetor to ground 61. The idle speed adjusting mechanism will be further described hereafter. Transmission control lever 58 is of the type used with current automatic transmissions and operates in conjunction with an indicator dial 62 having circumferential index designations P (park), N (neutral) D (drive) L (low) and R (reverse) indicating the transmission condition corresponding with the various positionings of lever 58. A switch blade 63 is movable with lever 58 and, in the neutral position of the lever, bridges terminals 56 and 57. Consequently, when air conditioner switch 49 is closed or "on" and transmission control lever 58 is in the neutral position, electrical energy will be supplied from the battery through circuits 55, 59 to idle speed control solenoid 60 to increase the idling speed, as described hereafter.

Figure 3:
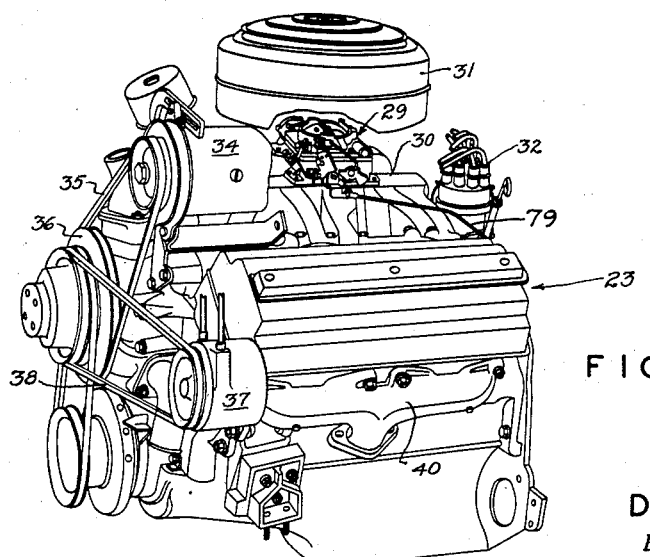
Figure 7:
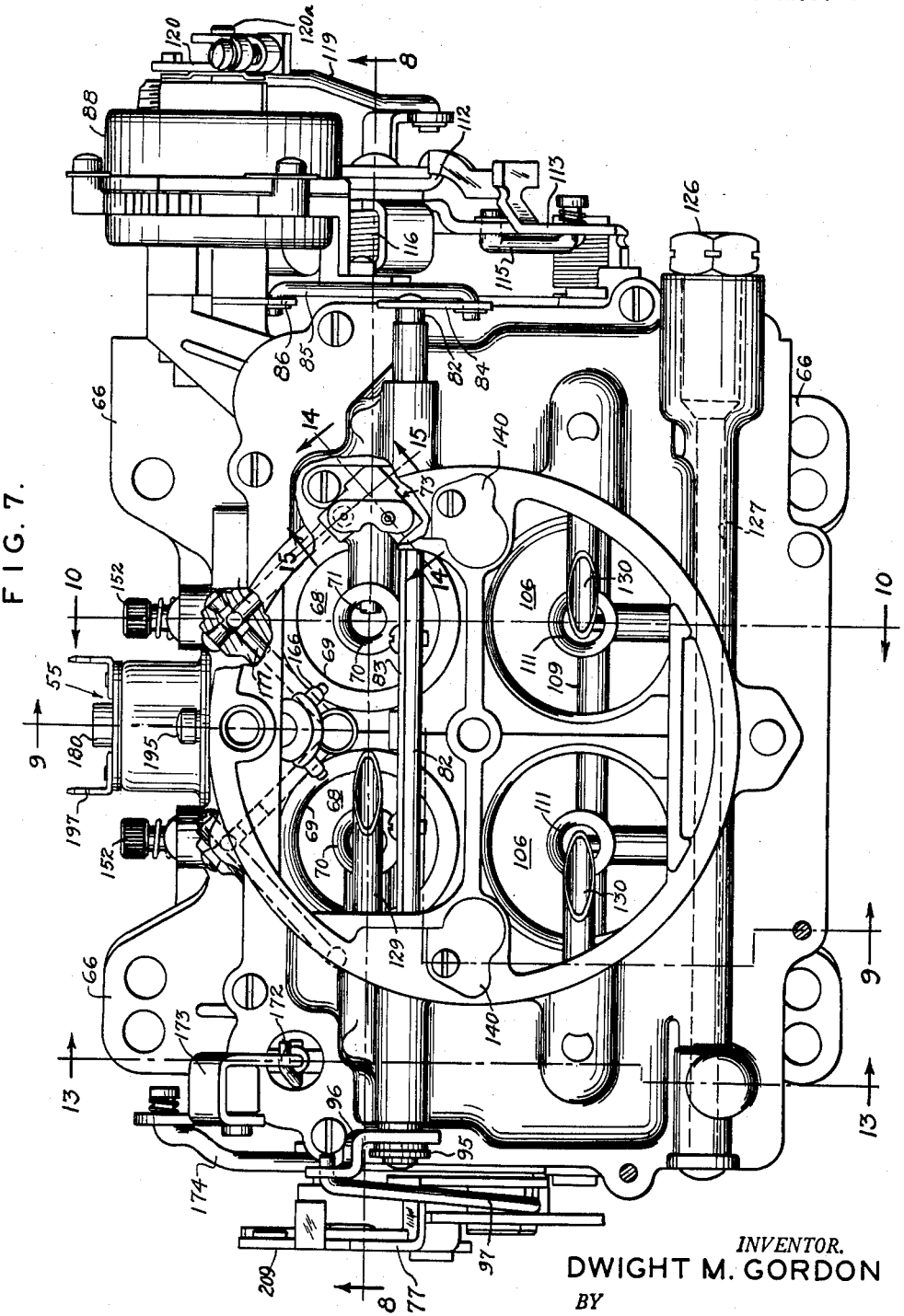
FIG. 7 is a top view of the carburetor, portions being broken and sectioned.

The carburetor, as more fully illustrated in the remaining figures, is of the four-barrel, two-stage, downdraft type, including, generally, a body casting 65, flanged at 66 for attachment to the intake manifold, and an air inlet horn casting 67 bolted to the top of the body. Each primary mixture conduit or barrel 68 has a centrally located main venturi-shaped portion 69 and an inner, primary venturi tube 70 into which discharges main nozzle tube 71 supported in fin portion 72 of main nozzle casting 73. Extending transversely entirely through the lower part of the body casting is a primary throttle shaft 74 mounting throttle valve discs 75 for controlling the discharge of combustible mixture through outlet portions 76 of the mixture conduits to the intake manifold branches registering, respectively, therewith. Rigidly secured to the left-hand extremity of primary throttle shaft 74 (FIGS. 7 and 5) is a throttle-operating lever 77 having an aperture 78 for attachment by means of linkage 79 (FIG. 3) to the accelerator pedal in the driver's compartment.

Figure 10:
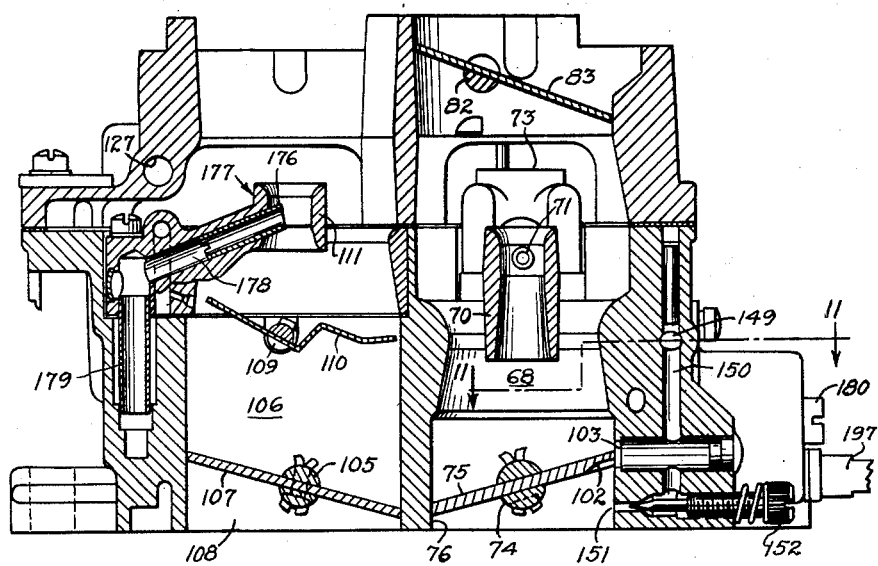
FIG. 10 is a similar section taken on line 10—10 of FIG. 7.

Journalled in the upper part of the air horn casing, above primary mixture condits 68, is a choke shaft 82 which mounts a single, unbalanced butterfly-type choke valve 83 for restricting the supply of air to the primary conduits for cold starting and warm-up. At its right-hand end (FIGS. 7 and 6) choke shaft 82 rigidly mounts a lever arm 84 connected by a link 85, a second lever arm 86, a countershaft 87, journalled in the inner wall of automatic choke housing 88, and a third lever arm 89 to the extremity 90 of a coiled thermostat 91 also within housing 88. Third lever arm 89 (FIG. 6) is connected by a link 91 to a suction piston 92a which works in a cylinder 93 connected through a passage 94 to intake manifold suction posterior to throttle valves 75. Choke shaft 82, at its left-hand end (FIGS. 7 and 5) is provided with a small arm 95 which cooperates with an arm 96, loosely received on the end of shaft 82 just inwardly of arm 95, and connected by a link 97 to fast idle cam 98. Cam 98 has a high part 99 which is engaged by adjusting screw 100 carried by throttle control lever 77, when the choke is closed, to limit the closing or return movement of the primary throttle valves to the fast idle position. Teeth 101 on the cam provide for variably decreasing the fast idle speed as the choke valve opens, rotating the cam clockwise. When the choke valve is fully opened and the engine is operating under normal temperatures, the primary throttle valves may be fully closed, as indicated in FIG. 10. These throttle valves are slightly relieved, as at 102, to accommodate idling mixture supplied through ports 103.

Figure 6:
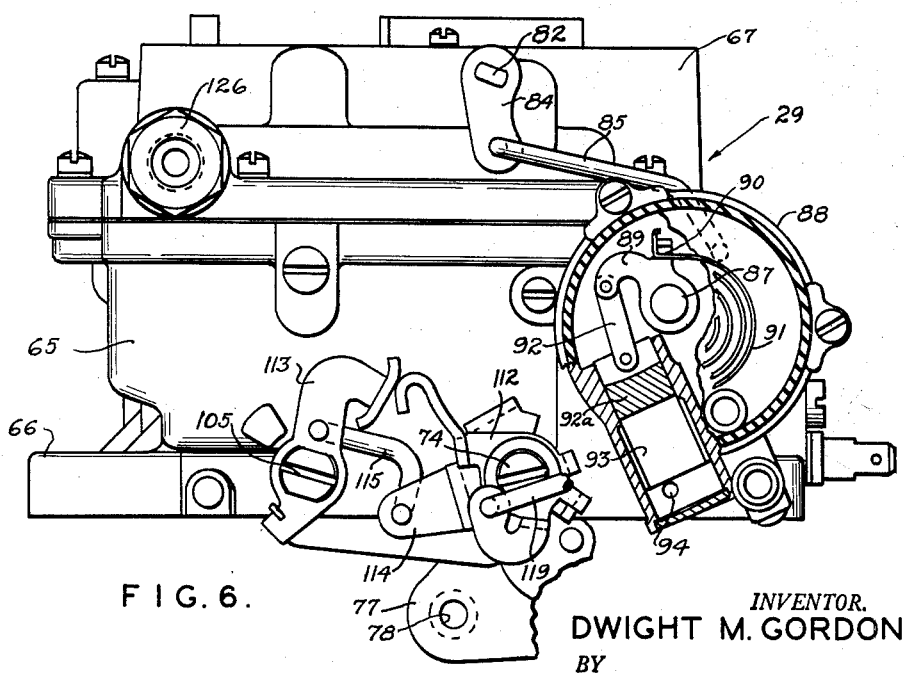
FIG. 6 is a view of the opposite side of the carburetor, portions being broken away and sectioned.

As also shown in FIG. 10, a secondary throttle shaft 105 extends across the lower portions of secondary mixture conduits 106 and mounts secondary throttle valve discs 107 for controlling the discharge of mixture from the discharge portions 108 of the secondary conduits. Also traversing the secondary conduits is a shaft 109 mounting an auxiliary, unbalanced throttle valve 110 in each secondary conduit between the main secondary throttle 107 and primary venturi tube 111 therein. At their right-hand ends, FIG. 7, and as shown in FIG. 6, the main primary and secondary throttle shafts are connected by one-way linkage, including tight arms 112 and 113, respectively, on the primary and secondary throttle shafts, and a loose arm 114 received about primary shaft 74 and connected by a link 115 to secondary arm 113. This linkage connection is such that at a pre-determined point prior to full opening of the primary throttle valves 75, tight arm 112 abuts loose arm 114 on the primary shaft and positively opens secondary throttle valves 107.

Since it is customary to lock out the secondary throttles when the choke valve is closed, loose and tight levers 114 and 112 on the primary throttle shaft are connected by a torsion spring 116 which permits full opening of the primary throttle even when the secondary throttles are locked closed. A weighted lock-out eccentric 117 cooperates with a shouldered disc 118 on the secondary throttle shaft 105 to lock the secondaries closed when the choke is closed. When the choke opens, eccentric 117 is shifted clockwise to clear the secondary throttles.

Tight arm 112 is also connected by a link 119 to an arm 120 which rotates a shaft 120a journalled in the automatic choke housing cover and secured to the inner extremity of the thermostat coil so as to adjust the thermostat tension in accordance with throttle positioning. Unloading action may be effected in case the engine fails to start during cranking, by substantially fully opening the primary throttle which causes tang 77a (FIG. 5) to engage and rotate cam 98 to slightly open the choke valve. At the ends of auxiliary throttle shaft 109, are eccentric weights 121 (FIGS. 9 and 12) yieldingly urging the valves 110 toward their closed positions. As the main secondary throttles 107 open, differential air pressure is applied to auxiliary throttles 110 which start to open when the engine speed and rate of air flow increases a pre-determined amount to initiate the second stage of carburetor operation.

At the sides of the mixture conduits (FIGS. 7, 8 and 12) are constant level fuel chambers 122 and 123 enclosing floats, as at 124 in FIG. 13, each controlling an inlet needle valve, as at 125, for maintaining a supply of fuel in the chamber substantially at a constant level. At the right-hand side of the air horn casting (FIG. 7) there is provided a fuel inlet fitting 126 for attachment to fuel supply line 28 from engine mounted pump 27. Fitting 126 is at the end of a cross passage 127 which connects through a needle valve controlled inlet, as 128, with each of the constant level fuel chambers. Since fuel pump 27 is designed to supply adequate quantities of fuel at a substantially constant pressure, the float and needle valve mechanisms may be correspondingly designed to control the supply of fuel to the carburetor in accordance with the engine demands. The upper portions of the constant level chambers are connected by balance tubes 129 and 130 to the air inlets, respectively, above the primary and secondary mixture conduits so as to maintain uniform pressure in the air horn and above the fuel level in the constant level chambers.

Figure 11:
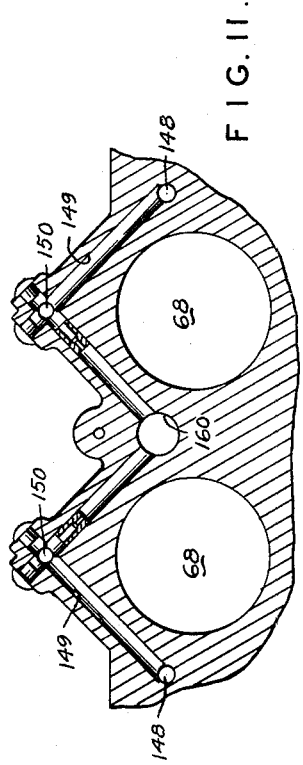
FIG. 11 is a horizontal detail section taken on line 11—11 of FIG. 10.

Each main fuel nozzle 71 connects by means of a slightly inclined cross passage 71a and a vertical bore 131, equipped with a depending tube 132, with a well 133 which, in turn, connects by means of an angled passage 134 to a main metering orifice element 135 (FIG. 9) located in the lower portion of a recess 136 in the inner wall of the corresponding constant level chamber (FIG. 12). Each main metering orifice element 135 is provided with a vertical, stepped metering rod 137 connected at its upper extremity to a suction piston 138 which responds to intake manifold suction to enrich the fuel mixture under low manifold suction conditions and lean out the mixture under relatively high manifold suction conditions. Cavity 139 provided for access to each suction piston and metering rod is closed by a cover 140 held in position by a machine screw 141. Fuel for idling is supplied through idling metering tube 144, which depends through each main nozzle tube 132 into well 133, and, at its upper end, communicates through a cross passage 145, economizer restriction 146, and vertical bore 147 with a vertical duct 148 formed in the carburetor body in line with passage 147 (FIGS. 15 and 11). Each duct 148, in turn, connects by a cross passage 149 with a spaced, vertical passage 150 which leads to idle ports 103 and 151 adjacent and slightly posterior to the edge of the corresponding primary throttle valve when closed. Lower port 151 is provided with an adjusting screw 152 for varying the quantity of rich idling mixture supplied. At the upper end of vertical passageway 148, 147, there is provided an atmospheric bleed port 153 (FIG. 15) opening into a recess 154 in the air horn wall. The outer end of idling cross passage 145 is, in this case, though not necessarily, provided with a calibrated air bleed restriction 155 opening into the air horn.

Figure 8:
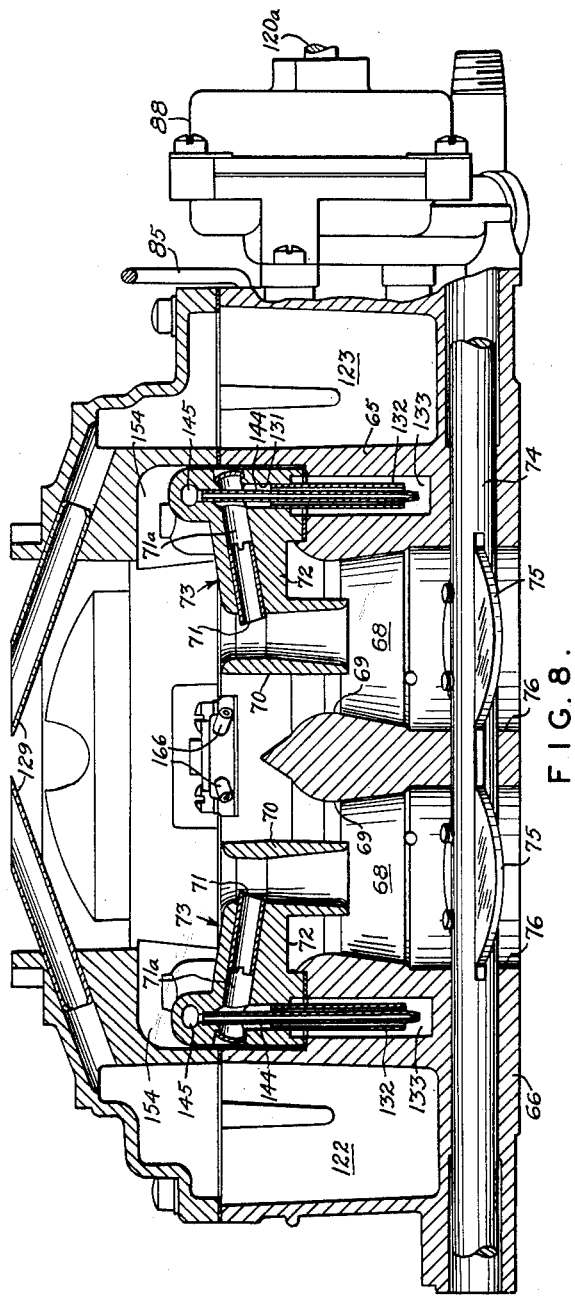
FIG. 8 is a vertical transverse section taken on line 8—8 of FIG. 7.

As indicated in FIGS. 8 and 15, idle metering tube 144 and metering restrictions 146, 153 and 155 are carried by and formed in main nozzle support casting 73. Also formed in this casting (FIG. 14) is the main nozzle air bleed passage 155 terminating at its upper extremity in a vertical tube 156 extending upwardly into cavity 154. At its lower extremity, passage 155 communicates through a lateral enlargement 157 with the top of main nozzle well 133 which, accordingly, forms an accelerating well for the main nozzle system. Castings 73 are secured in position by machine screws 157.

Figure 9:
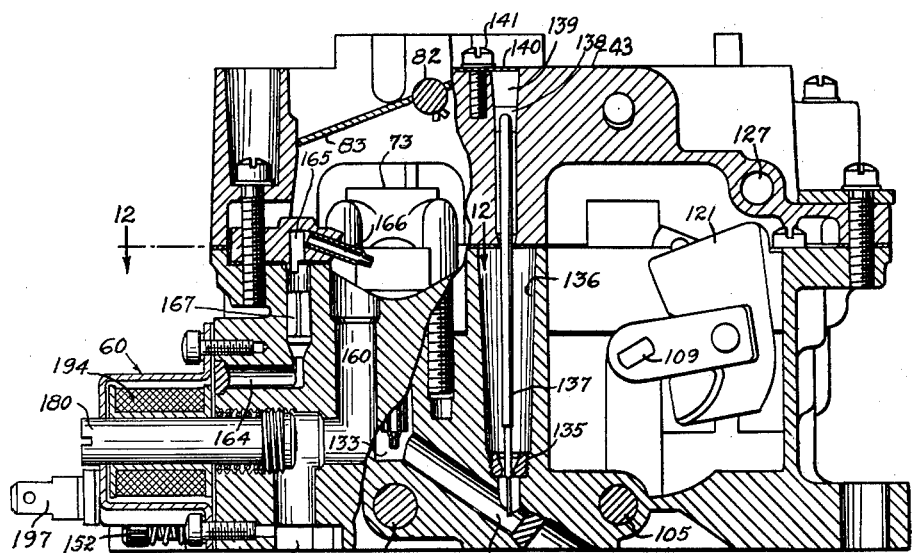
FIG. 9 is a vertical transverse section taken substantially on broken line 9—9 of FIG. 7.

As best shown in FIGS. 9 and 11, an idling air bypass 160 extends from the air inlet horn portion of each primary mixture conduit around the primary throttle and thence, by lateral extension 161 at its lower extremity, into the outlet portions 76 of the primary mixture conduits. This idling air by-pass is provided with manual and automatic adjusting valve means for varying the idling speed, to be described hereafter.

Figure 5:
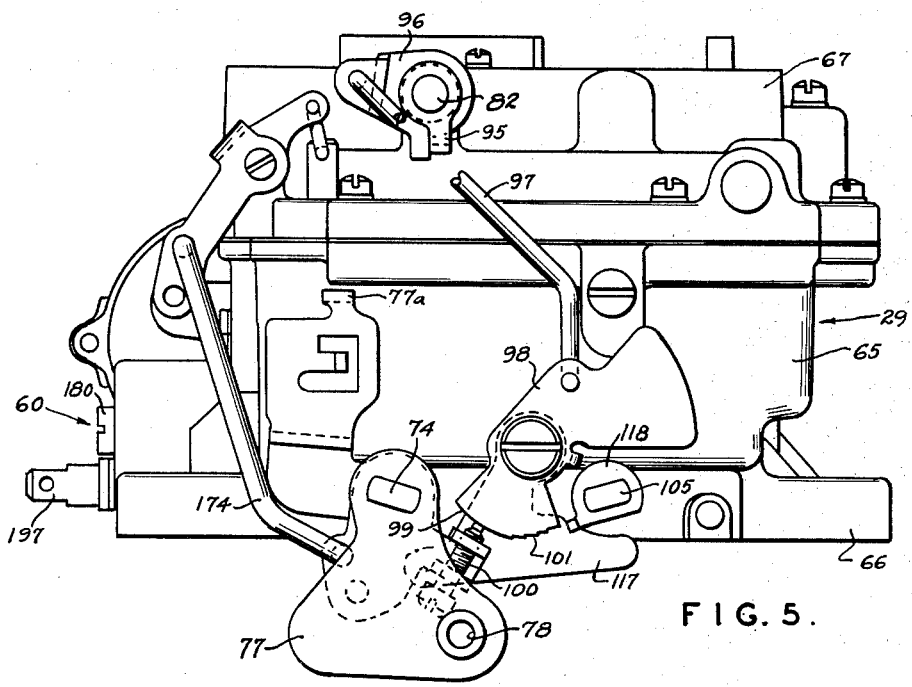
FIG. 5 is a side view of the carburetor considerably enlarged.

Also mounted in left-hand constant level chamber 122 (FIGS. 7 and 13) is an accelerating pump including cylinder 162 communicating through a slot 163 with the constant level chamber and connected by pump discharge passaging shown in part at 164 and 165 in FIG. 9 with discharge nozzles 166, each discharging into one of the primary mixture conduits (FIG. 8). An outlet check valve is shown at 167 in passage 164, 165. Working in cylinder 162 is a pump piston 168 connected by a collapsible piston rod device 169, 170, 171, a link 172, pivoted lever 173, and a second link 174 to throttle control lever 77 (FIG. 5). The piston rod device is normally maintained extended by a coiled compression spring 175 so that upon opening of the primary throttles, pump piston 168 is yieldingly urged downwardly to force an accelerating charge of fuel through nozzles 166 into the carburetor and engine. Slot 163 communicates with the fuel bowl so that fuel always covers the pump leather to prevent alternate wetting and drying. Fuel is admitted to the pump chamber through check valved inlet 192.

Fuel is supplied to the secondary mixture conduits through main nozzles 176 opening into inner venturi tubes 177 and connected by passages 178, 179 with the constant level chambers. No idling, step-up or accelerating systems are provided on the secondary side of the carburetor.

Figure 16:
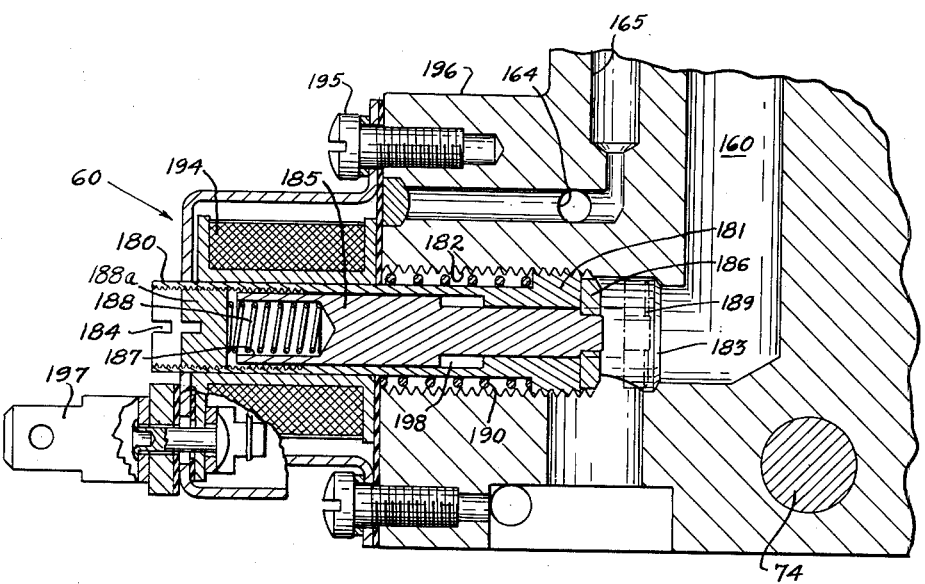
FIG. 16 is an enlarged view of a portion of the structure in FIG. 9 to better illustrate specific details of the invention.
Figure 17:
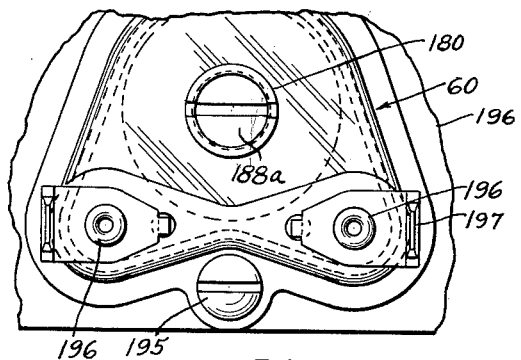
FIG. 17 is an elevation showing the left-hand side of the structure in FIG. 16.

The idling air by-pass 160, as best shown in FIGS. 9, 16 and 17, is provided with adjusting valve means including a sleeve 180 with an externally threaded enlargement 181 at its inner end received in internally threaded bore 182 formed in the carburetor body intersecting by-pass 160 at offset portion 183 thereof. Sleeve 180 has a screwdriver kerf 184 at its outer end for setting the valve mechanism. Slidably received in sleeve 180 is a plunger 185 having a valve forming disc 186 at its inner extremity and a cupped outer extremity 187 accommodating a compression spring 188 having an outer end abutting an adjustable nut 188a and which normally urges the plunger rightwardly as viewed in FIG. 16, approximately to the position indicated by dotted line 189, for establishing the effective size of the idling air by-pass and, consequently, the idling speed under normal temperature conditions. The position 189 of valve 186, and, consequently, the idling speed of the engine may be adjusted by turning sleeve 180 so as to increase or decrease the effective size of the idling by-pass when plunger 185 is expanded. Coil spring 190 received about sleeve 180 tends to hold the sleeve in its adjusted position.

Mounted about the outwardly projecting portion of sleeve 180 is a solenoid 194 of which plunger 185 forms the core. The solenoid is mounted by means of machine screws 195 on a boss 196 provided on the carburetor body casting. Terminal clips 197 provide for attachment of wire 59 and the wire leading to ground 61.

As indicated in FIG. 4, the electrical control circuits are such that when the air conditioner switch 49 is closed so as to operate control valve 46 to place the compressor 37 in operation, and transmission lever 58 is in a neutral position, solenoid 194 will be energized to shift valve disc 186 leftwardly, to the position shown in FIG. 16, for increasing the effective size of the idling air by-pass and, consequently, the idling speed of the engine. The amount of play shown at 198, of course, determines the range of idling speed in the two positions of valve 186. The initial setting of the normal idling speed of the engine, with the air conditioner off and/or the transmission in a position other than neutral or park, is determined by the positioning of threaded sleeve 180. Increasing the amount of play provided at 198, by adjusting nut 188a outwardly will permit increasing the idling speed with the solenoid energized.

While the novel idling speed adjustment has been illustrated in connection with an air conditioning system and transmission control, it is contemplated that the idle by-pass control features may be used in connection with other vehicle engine powered accessories which apply a load to the engine requiring higher than normal idling speed. For instance, such feature may be used in connection with power steering which, frequently, is operated while the engine is idling, to turn the front wheels. An important feature of the invention is the constant ratio idle system as shown in FIG. 11, which assures burnable or usable air fuel mixtures with wide changes in idle by-pass air resultant upon open and closed solenoid positions.

The invention may be modified in various respects as will occur to those skilled in the art and the exclusive use of all modifications as come within the scope of the appended claims is contemplated.

I claim:

1. The combination in an automotive vehicle having an internal combustion engine with a fuel-air mixture conduit and a throttle therein, an engine powered accessory, and a transmission control, of an idling air by-pass to supply additional air to said conduit posterior to said throttle, a valve for said by-pass, and means operatively connecting said valve to said accessory for moving said valve to vary the engine idling speed in accordance with the condition of said accessory and the position of said control.

2. The combination in an automotive vehicle having an internal combustion engine with a fuel-air mixture conduit and a throttle therein, a transmission with a control, and an engine powered accessory with a control, of an idling air by-pass to supply additional air to said conduit posterior to said throttle, a valve in said by-pass, and operative connections between said valve and said controls for varying the engine idling speed in accordance with the positions of said controls.

3. In an automotive vehicle having an internal combustion engine with a fuel-air mixture conduit and a throttle therein, a transmission, and an engine powered accessory, an idling air by-pass to supply additional air to said conduit posterior to said throttle, a valve in said by-pass, manually adjustable stop means for said valve for setting the idling speed of the engine, and control means operatively connecting said valve, said transmission, and said accessory for shifting said valve to a less restricting position to increase the engine idling speed when said transmission is in neutral position and said accessory is conditioned to apply a load to the engine.

4. The combination described in claim 3 in which said control means includes elements actuable, respectively, upon shifting of said transmission between "drive" and "neutral" conditions and coincidentally with conditioning of said accessory for applying an increased load on the engine.

5. In a carburetor, for an internal combustion engine, a fuel-air mixture conduit, a throttle therein, an idle air by-pass to supply additional air to said conduit posterior to said throttle, a valve in said by-pass, electro-magnetic means to open said valve to increase the idling speed of the engine, and manually adjustable stop means to limit the restricting position of said valve and thereby set the normal idle speed.

6. In a carburetor, for an internal combustion engine, a fuel-air mixture conduit, a throttle therein, an idle air by-pass to supply additional air to said conduit posterior to said throttle, a sleeve mounted adjacent said by-pass and opening thereinto, a solenoid surrounding said sleeve, and a solenoid core in said sleeve operable to increase the flow of air through said by-pass to increase the engine idling speed when said throttle is in its idle position.

7. The combination described in claim 5 further including variable stop means to adjust the idling position of said throttle.

8. In apparatus for controlling the idling speed of the engine of an automotive vehicle, an accessory to be driven from the engine, a carburetor having a mixture conduit for supplying a combustible mixture of fuel and air to the engine, a throttle valve in said mixture conduit for controlling the quantity of mixture supplied to the engine, an auxiliary air conduit for supplying additional air to said mixture conduit posterior to said throtttle valve, an air control valve for controlling the flow of air through said auxiliary air conduit, manually operable control means for said accessory, and means operable responsive to actuation of said control means to actuate said control valve to vary the idling speed of the engine.

9. An apparatus for controlling the idling speed of the engine of an automotive vehicle having an accessory adapted to be driven by the engine, said apparatus comprising a carburetor including a mixture conduit for supplying a combustible mixture of fuel and air to the engine, a throttle valve in said mixture conduit for controlling the quantity of mixture supplied to the engine, a second conduit for supplying additional air to said carburetor posterior to said throttle valve, an air control valve for controlling the flow of air through said second conduit, and control means to effect operation of said accessory and to simultaneously open said control valve for increasing the idling speed of the engine.

10. An apparatus for controlling the idling speed of the engine of an automotive vehicle having an accessory adapted to be driven by the engine, said apparatus comprising means including a mixture conduit for supplying a combustible mixture of fuel and air to the engine, a throttle valve in said mixture conduit for controlling the quantity of mixture supplied to the engine, a conduit for supplying additional air to said mixture conduit posterior to said throttle valve, an air control valve for controlling the flow of air through said conduit, resilient means biasing said valve toward its closed position, and control means to effect operation of said accessory and to simultaneously open said control valve for increasing the idling speed of the engine.

11. In apparatus for controlling the idling speed of the engine of an automotive vehicle having an accessory adapted to be driven by the engine, a carburetor for supplying a combustible mixture of fuel and air to the engine, a throttle valve for controlling the quantity of mixture supplied to the engine, a conduit for supplying additional air to said carburetor posterior to said throttle valve, an air control valve for controlling the flow of air through said conduit, resilient means biasing said valve toward its closed position, and electrical control means to effect operation of said accessory and to simultaneously open said control valve for increasing the idling speed of the engine.

12. In apparatus for controlling the idling speed of the engine of an automotive vehicle having an engine powered accessory, a carburetor for supplying a combustible mixture of fuel and air to the engine, a throttle valve for controlling the quantity of mixture supplied to the engine, a conduit for supplying additional air to said carburetor posterior to said throttle valve, an air control valve for controlling the flow of air through said conduit, and means operable upon an increase in engine load resulting from operation of said engine powered accessory to open said control valve for increasing the idling speed of the engine.

13. In apparatus for controlling the idling speed of the engine of an automotive vehicle having an engine powered accessory, a carburetor for supplying a combustible mixture of fuel and air to the engine, a throttle valve for controlling the quantity of mixture supplied to the engine, a conduit for supplying additional air to said carburetor posterior to said throttle valve, an air control valve for controlling the flow of air through said conduit, and electrical means operable upon an increase in engine load resulting from operation of said engine powered accessory to open said control valve for increasing the idling speed of the engine.

14. In apparatus for controlling the idling speed of the engine of an automotive vehicle having an engine powered accessory, a carburetor for supplying a combustible mixture of fuel and air to the engine, a throttle valve for controlling the quantity of mixture supplied to the engine, a conduit for supplying additional air to said carburetor posterior to said throttle valve, an air control valve for controlling the flow of air through said conduit, electrical means operable upon an increase in engine load resulting from operation of said engine powered accessory to open said control valve for increasing the idling speed of the engine, and resilient means yieldably resisting opening of said control valve.

15. In apparatus for controlling the idling speed of the engine of an automotive vehicle having an engine powered accessory, a carburetor having a mixture conduit for supplying a combustible mixture of fuel and air to the engine, a throttle valve in said mixture conduit for controlling the quantity of mixture supplied to the engine, an auxiliary air conduit for supplying additional air to said mixture conduit posterior to said throttle valve, an air control valve for controlling the flow of air through said auxiliary air conduit, means comprising a solenoid to actuate said control valve to vary the idling speed of the engine, resilient means urging said control valve toward its closed position, and stop means to limit opening movement of said control valve.

16. In apparatus for controlling the idling speed of the engine of an automotive vehicle having an engine powered accessory, a carburetor having a mixture conduit for supplying a combustible mixture of fuel and air to the engine, a throttle valve in said mixture conduit for controlling the quantity of mixture supplied to the engine, an auxiliary air conduit for supplying additional air to said mixture conduit posterior to said throttle valve, an air control valve for controlling the flow of air through said auxiliary air conduit, means comprising a solenoid to actuate said control valve to vary the idling speed of the engine, resilient means urging said control valve toward its closed position, one stop means to limit opening movement of said control valve, and another stop means to limit closing movement of said control valve.

17. In apparatus for controlling the idling speed of the engine of an automotive vehicle having an engine powered accessory, a carburetor having a mixture conduit for supplying a combustible mixture of fuel and air to the engine, a throttle valve in said mixture conduit for controlling the quantity of mixture supplied to the engine, an auxiliary air conduit for supplying additional air to said mixture conduit posterior to said throttle valve, an air control valve for controlling the flow of air through said auxiliary air conduit, means comprising a solenoid to actuate said control valve to vary the idling speed of the engine, resilient means urging said control valve toward its closed position, one stop means to limit opening movement of said control valve, another stop means to limit closing movement of said control valve, and means to adjust the positions of said stop means.

18 An automotive vehicle comprising an internal combustion engine including a carburetor, a throttle in said carburetor, an engine powered vehicle accessory, a control operatively connected to said accessory, said carburetor including means forming an idle air by-pass supplying air posterior to said throttle, means to manually adjust said by-pass to set the engine idling speed, and means operatively connected to said control to vary the air flowing through said by-pass to change the idling speed in accordance with the condition of said accessory.

19. An automotive vehicle having an engine, an engine powered accessory connected to said engine to be driven thereby, a carburetor mounted on said engine and having a conduit for supplying a combustible mixture of fuel and air to said engine, a throttle valve within said carburetor conduit for controlling the quantity of mixture supplied to said engine, means forming a passage connected to said carburetor for supplying additional air posterior to said throttle valve, a control valve within said passage for controlling the flow of air therethrough, a spring biasing said control valve into a closed position, and a power motor means operable upon increase in engine load resulting from operation of said engine powered accessory to open said control valve for increasing the idling speed of said engine.

20. An automotive vehicle having an engine, an engine powered accessory connected to said engine to be driven thereby, a transmission, a transmission control, a carburetor mounted on said engine and having a conduit for supplying a combustible mixture of fuel and air to said engine, a throttle valve within said carburetor conduit for controlling the quantity of mixture supplied to said engine, means forming a passage connected to said carburetor for supplying additional air posterior to said throttle valve, a control valve within said passage for controlling the flow of air therethrough, a spring biasing said control valve into a closed position, a power motor connected to said control valve to open said passage for increasing the idling speed of said engine, means including a source of energy and a manual control for connecting said accessory to said engine to be operated thereby, and an operating means including said source of energy, said manual control and said transmission control to operate said control valve.

21. An automotive vehicle having an engine, an engine powered accessory connected to said engine to be driven thereby, a transmission, a transmission control, a carburetor mounted on said engine and having a conduit for supplying a combustible mixture of fuel and air to said engine, a throttle valve within said carburetor conduit for controlling the quantity of mixture supplied to said engine, means forming a passage connected to said carburetor for supplying additional air posterior to said throttle valve, a control valve within said passage for controlling the flow of air therethrough, a spring biasing said control valve into a closed position, an electric solenoid connected to said control valve to open said passage for increasing the idling speed of said engine, a first electrical circuit including an electrical source of energy, a first switch and an electric motor means to connect said accesory to said engine to be operated thereby, and a second electrical circuit including said electric solenoid, said source of energy, said first switch and a second switch connected to said transmission control to complete said second circuit when said transmission control is placed in a neutral position.

References Cited in the file of this patent

UNITED STATES PATENTS

| | | |
|---|---|---|
| 1,886,672 | Good | Nov. 8, 1932 |
| 2,075,272 | Dach | Mar. 30, 1937 |
| 2,082,583 | Lindbloom | June 1, 1937 |
| 2,155,670 | Macbeth | Apr. 25, 1939 |
| 2,359,925 | Leibing | Oct. 10, 1944 |
| 2,420,786 | Mallory | May 20, 1947 |
| 2,433,205 | Decker | Dec. 23, 1947 |
| 2,720,087 | Groene | Oct. 11, 1955 |
| 2,762,235 | Olson et al. | Sept. 11, 1956 |
| 2,891,388 | Boylan | June 23, 1959 |